US009191618B2

(12) United States Patent
Fluhr et al.

(10) Patent No.: US 9,191,618 B2
(45) Date of Patent: Nov. 17, 2015

(54) METHOD AND SYSTEM FOR PRODUCING AND VIEWING VIDEO-BASED GROUP CONVERSATIONS

(71) Applicant: SPREECAST, INC., San Francisco, CA (US)

(72) Inventors: Jeff Fluhr, San Francisco, CA (US); Robert Hunt, San Francisco, CA (US)

(73) Assignee: SPEEDCAST, INC., San Francisco, CA (US)

(*) Notice: Subject to any disclaimer, the term of this patent is extended or adjusted under 35 U.S.C. 154(b) by 83 days.

(21) Appl. No.: 14/063,848

(22) Filed: Oct. 25, 2013

(65) Prior Publication Data

US 2014/0118474 A1  May 1, 2014

Related U.S. Application Data

(60) Provisional application No. 61/718,994, filed on Oct. 26, 2012.

(51) Int. Cl.
*H04N 7/15* (2006.01)
*H04L 29/06* (2006.01)
*H04L 12/18* (2006.01)

(52) U.S. Cl.
CPC ............ *H04N 7/155* (2013.01); *H04L 12/1822* (2013.01); *H04L 65/403* (2013.01); *H04L 65/4076* (2013.01)

(58) Field of Classification Search
CPC .............. H04L 65/403; H04L 65/4076; H04L 12/1822; H04N 7/155; H04N 7/01; H04N 7/152
USPC ............................................ 348/14.01–14.16
See application file for complete search history.

(56) References Cited

U.S. PATENT DOCUMENTS

| | | | |
|---|---|---|---|
| 6,839,080 B2 * | 1/2005 | Meyers | 348/14.11 |
| 2002/0085030 A1 * | 7/2002 | Ghani | 345/751 |
| 2007/0208806 A1 * | 9/2007 | Mordecai et al. | 709/204 |
| 2010/0005402 A1 * | 1/2010 | George et al. | 715/758 |
| 2011/0145881 A1 * | 6/2011 | Hartman et al. | 725/118 |
| 2011/0286716 A1 * | 11/2011 | Alderson | 386/230 |

* cited by examiner

*Primary Examiner* — Melur Ramakrishnaiah
(74) *Attorney, Agent, or Firm* — Dergosits & Noah LLP; Todd A. Noah

(57) ABSTRACT

A system and method for producing a video-based group conversation for viewing over a network. A template is configured to generate a display at a first user computer which includes a plurality of sections in a single screen display, including at least a preview section configured for previewing a plurality of video feeds, and a media player section configured for displaying a video signal including at least some of the video feeds. The creator of the video-based group conversation controls which users can participate in the video-based group conversation by enabling video streams provided by those users to be displayed on the screen and viewable to other users who access the group conversation.

24 Claims, 14 Drawing Sheets

METHOD AND SYSTEM FOR PRODUCING AND VIEWING VIDEO-BASED GROUP CONVERSATIONS

CROSS-REFERENCE

This application claims priority from U.S. Provisional Patent Application No. 61/718,994 filed Oct. 26, 2012 entitled Methods and Systems for Public Video-Based Group Conversation and Synchronizing Playback of Multiple Independent Video Streams, which is incorporated herein by reference in its entirety.

TECHNICAL FIELD

This disclosure relates generally to the field of signal processing, and more particularly, to a system and method for creating and producing a video-based group conversation over the Internet.

BACKGROUND

Video conferencing is generally known in which two or more locations communicate with each other by simultaneous two-way video and audio transmission. For example, GoToMeeting, WebEx and Skype are popular commercial services where group video conferences can be conducted online for anyone with an Internet connection. However, these video conferencing services do not permit live public viewing of the video conferences—only invitees may participate. Skype is sometimes used in conjunction with public television broadcasts, but it is used as a video source only and thus does not allow television viewers to join on air. GoToMeeting, WebEx and Skype also require additional client software as opposed to working entirely within a web or mobile browser. Generally, such video conferencing services also limit the number of participants to hundreds or low thousands of viewers.

Other video conferencing services, like Google Hangouts and Tinychat, do allow public viewing, but lack a robust set of production tools for controlling the creation and production of the live video session and/or lack the ability for viewers to interact. Google Hangouts, for example, allows a large audience of off-camera viewers but they are not able to join the video conversation on camera, participate in text chat, or share media such as photos, recorded videos or slide decks.

It would thus be desirable if a video conferencing service allowed for tens of thousands of viewers to participate in a public group-based video conversation and provided a full set of production controls that enabled any user of the service to create and produce a group-based video conversation consisting of multiple video and audio streams that may be selected to be on camera by a producer.

DETAILED DESCRIPTION

1. Overview

Figure 1:
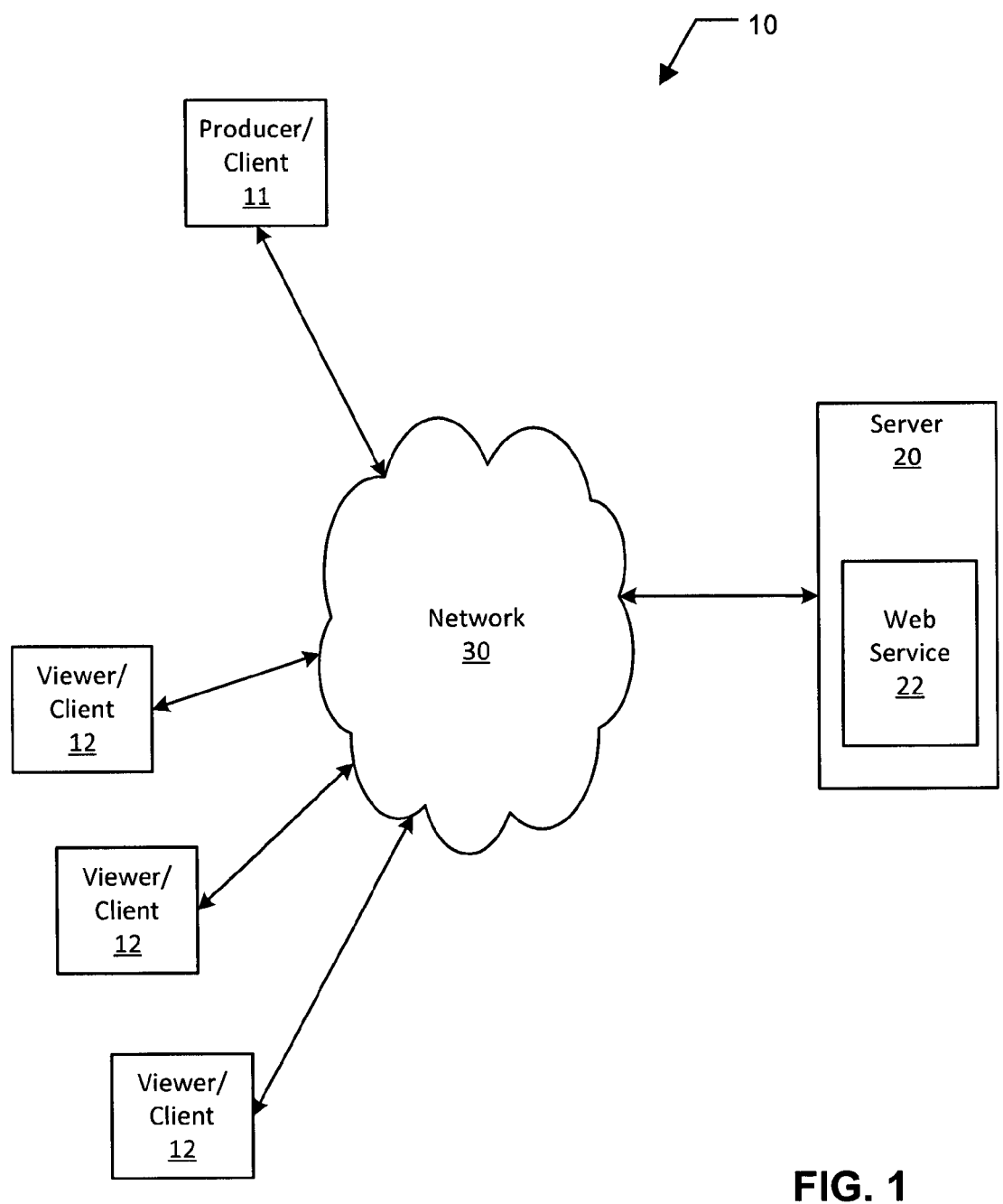
FIG. 1 is a block diagram of a system for producing a video-based group conversation.

This disclosure is directed to systems and methods for creating and producing a video-based group conversation over a network, such as the Internet, and for making the group conversations discoverable, searchable and accessible over the network. Referring to FIG. 1, a typical client/server computing environment 10 is illustrated in which a number of client computers 11, 12 are coupled to a server computer 20 via a computer network 30. The client computers 11, 12 and the server computer 20 may be conventional computing devices, such as a desktop computer, laptop computer, smartphone, tablet, etc.

As described more particularly below, the server computer 20 hosts a web service 22 that provides a software platform having one or more application programs that users of the client computers 11, 12 can access for creating, viewing, and/or participating in a video-based group conversation. Advantageously, the web conversation event can be viewed live and in real-time over the network 30 and/or also recorded and stored for viewing at a later time or upon request by a user. Further, the creator can choose to make the video-based group conversation public, private or unlisted. If the creator chooses to make the video-based group conversation public, it will be discoverable, for example, through a user's search results, a directory of public conversations, etc., and accessible, for example, through a URL accessible in a web browser, screen in a mobile app, etc. Audio and video streams may be transmitted using HTTP protocol or UDP protocol.

In one embodiment, the user who creates a video-based group conversation is, by default, designated the "creator." However, the creator may also designate one or more other users as co-producer with a full or limited set of producer tools to facilitate producing the video-based group conversation. The creator or co-producer may designate the video-based group conversation as "public" so that the video-based group conversation is accessible to any user, and the event can be logged to a public directory or otherwise made searchable. Alternatively, the conversation may be designated as "private" so that only invited users can access and view it, or "unlisted" so that access is limited to only those users who know the URL.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on a mass storage device. The source code of the software may also be stored or reside on a mass storage device (e.g., hard disk, magnetic disk, tape or CD-ROM). As a further example, software code may be transmitted via wires or radio waves, or downloaded through a network such as the Internet.

Computer software products may be written in any of various suitable programming languages, such as Ruby, Go, C, C++, C#, Pascal, Fortran, Perl, Matlab (from MathWorks), SAS, SPSS, JavaScript, ActionScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product that stores instructions, such as computer code, that when executed by a computer, cause the computer to perform the processes and/or techniques described below.

The server computer 20 and each client computer 11, 12 run an operating system (OS) to manage hardware resources and provide common application services for application software. As an example, the server computer 20 may run a Microsoft Windows® operating system (e.g., Windows NT, Windows XP, Windows Vista, Windows 7, Windows CE, Windows Mobile), or Linux®, UNIX®, Sun® OS, Solaris®, Mac® OS X, Alpha® OS, AIX, IRIX® 32, or IRIX® 64. Other operating systems may also be used. Also by way of example, the client computers, which can be mobile devices, may run an Apple operating system (Mac OS X, iOS), a Google operating system (Android, Chromium), a Windows operating system (Windows 8, Windows 7, etc.) or a Linux or Unix operating system.

2. Creating the Video-Based Group Conversation

Figure 2:
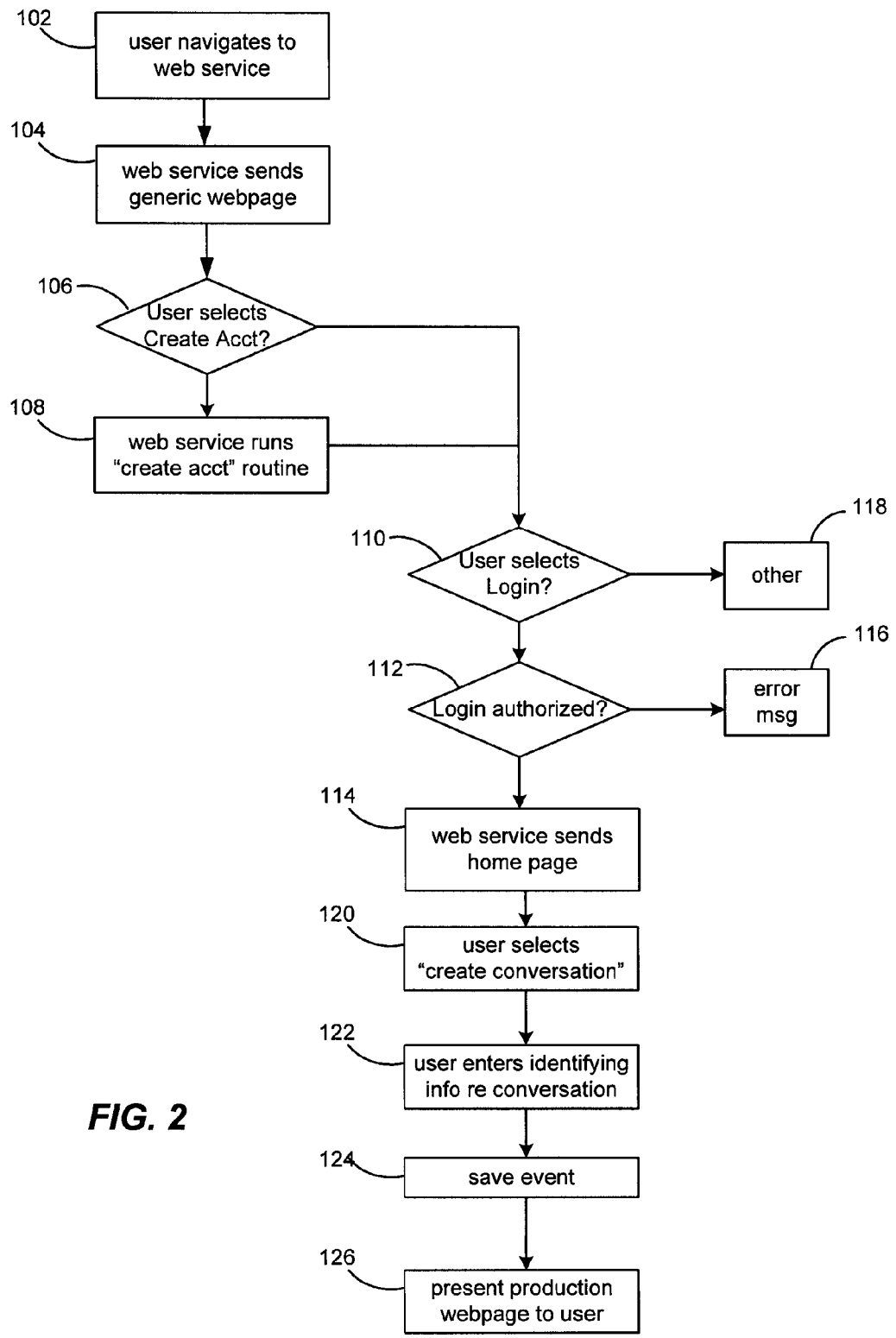
FIG. 2 is a flow chart of a method for creating a video-based group conversation.

A method 100 for creating a video-based group conversation having multiple viewers and participants using a web-based service 22 is illustrated in FIG. 2. In step 102, a user desiring to create a video-based group conversation navigates to a specific web address for such service 22, for example, using a browser program on a computing device. In the example described herein, a browser program is used to navigate to a web site, but the same functionality can be achieved through a customized application installed on a mobile computing device. The web address is a URL that locates the website hosting the web-based service 22. For example, a commercial embodiment of the web-based service 22 and method 100 has been implemented by Spreecast, Inc., of San Francisco, Calif., at the web address www.spreecast.com. Examples of browser programs include the Firefox browser by Mozilla Foundation, the Internet Explorer browser by Microsoft Corporation, the Chrome browser by Google, the Safari browser, the mobile versions of the above browsers and others. As noted above, accessibility to the live and recorded video-based group conversations can also be delivered directly through a mobile application and installed on a mobile computing device.

Upon the user navigating to the website, in step 104, the web service 22 transmits a generic webpage to the user for display on the user's computing device 12. As is typical for web-based services, the generic webpage includes among other features a first link or button for existing users of the web service to select for logging into the web service 22, and a second link or button for new users to register with the web service. Each link or button initiates a programmed routine for user interaction with the service 22. It should be noted that while the systems and methods described herein utilize graphical user interfaces to interact with users in well-known manner, and while specific functional widgets are described, such as links, buttons, forms, tabs, pop-up dialogs, web pages, pull-down menus, etc., the desired functionality can be implemented in many different ways with different types of widgets and applications, and the description of a particular widget should be considered merely exemplary and not limiting. As such, the above example could also have been implemented in a mobile application instead of a browser-based application with mobile screens instead of browser-based webpages.

If the user selects the link to register with the web-based conferencing service 22 in step 106, then the service performs a routine in step 108 to create an account for the new user. The new user may be presented with a pop-up dialog or a new webpage to create the new account including a corresponding user profile with the web service. The account and user profile may be created in one of several ways. For example, the user may be shown a predefined form that requests specific required and/or optional information from the user. Alternatively, and preferably, the user may be given the option to import authentication and profile information from another existing source account, such as social media sites like Facebook or Twitter, or a pre-existing email account of the user. In that case, the user may be shown a webpage or a pop-up dialog that asks for the login information for the chosen source account, if the user is not already logged into the source account. As is common, the user's login credentials, e.g., a user ID and password, may be saved by the service at the option of the user. A user may also create an account from a mobile application or an application on any computing device.

If the user is an existing user of the web service 22, or a new user having completed creating an account with the service, the login link may be selected in step 110. If the proper login credentials are presented to the web service 22 in step 112, either from direct entry by the user, or by importing from another source account, the user is directed to a home page that may be customized by or for the user in step 114. If the proper login credentials are not presented to the web service 22 in step 112, then an error message is generated in step 116. If the user has not chosen to create a new account in step 106, or login in step 110, then other content and links may be made available to the user on the generic web page in step 118. For example, other video-based group conversations may be listed and featured, or a search widget may be provided to enable keyword-based searching for public video-based group conversations that relate to specific topics, people, events, etc.

Figure 3A:
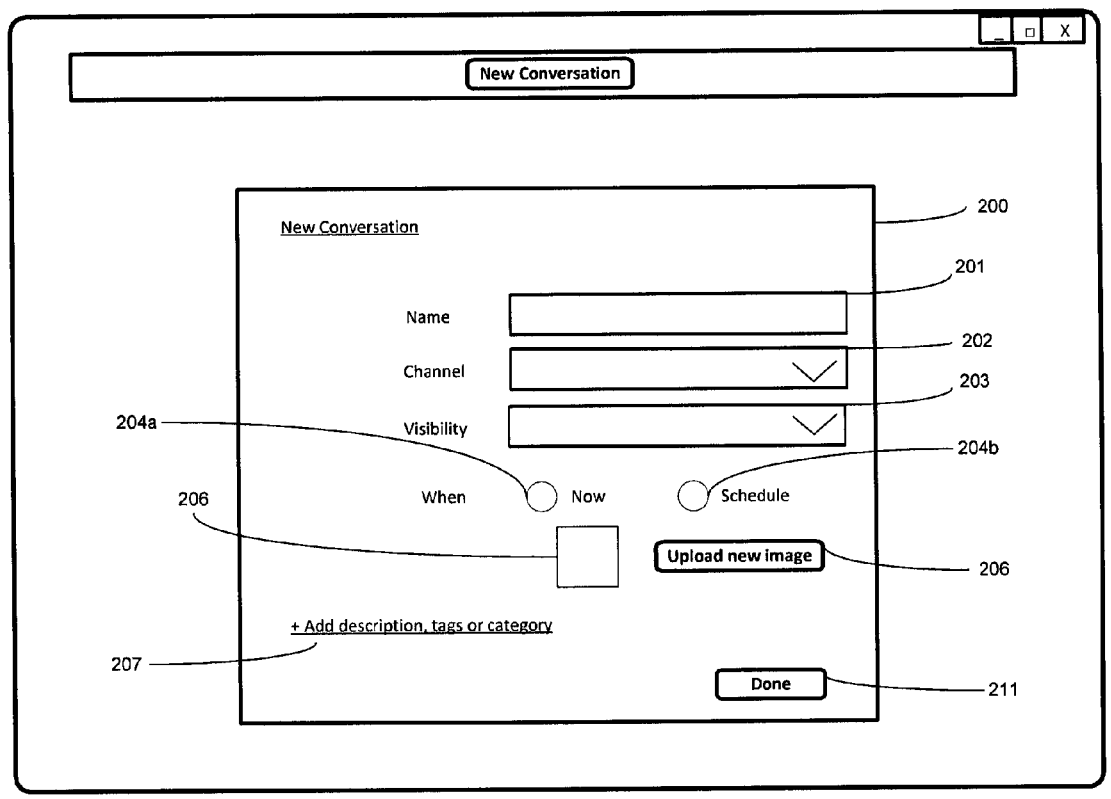
FIG. 3A illustrates a web page for entering identifying information about a video-based group conversation.

In step 120, the user who wishes to initiate a video-based group conversation (called the "creator") selects a link or button on the customized home page which is configured to initiate the creation of a new video-based group conversation. In one embodiment, in response to the selection of the link or button on the home page, the web-based conferencing service 22 may generate a dialog box 200 as a pop-up window with defined data fields, for example, as shown in FIG. 3A. Alternatively, a new web page may be presented to the user rather than a pop-up dialog. In step 122, the creator enters basic identifying information about the video-based group conversation into defined data fields of the dialog box 200 of FIG. 3A. For example, the defined data fields may include data entry field 201, where the producer can enter a name for the video-based group conversation; pull-down data field 202, where the producer can select an existing channel or define a new channel for the video-based group conversation; pull-down data field 203, where the creator can select the visibility of the video-based group conversation, e.g., public, private, or unlisted; and a pair of widgets 204a and 204b, where the creator can schedule the video-based group conversation now by selecting widget 204a, or at a later date and time by selecting widget 204b. If the creator selects widget 204b, then another pop-up dialog can be presented (not shown) to allow the creator to select a later date and/or time for the video-based group conversation.

Figure 3B:
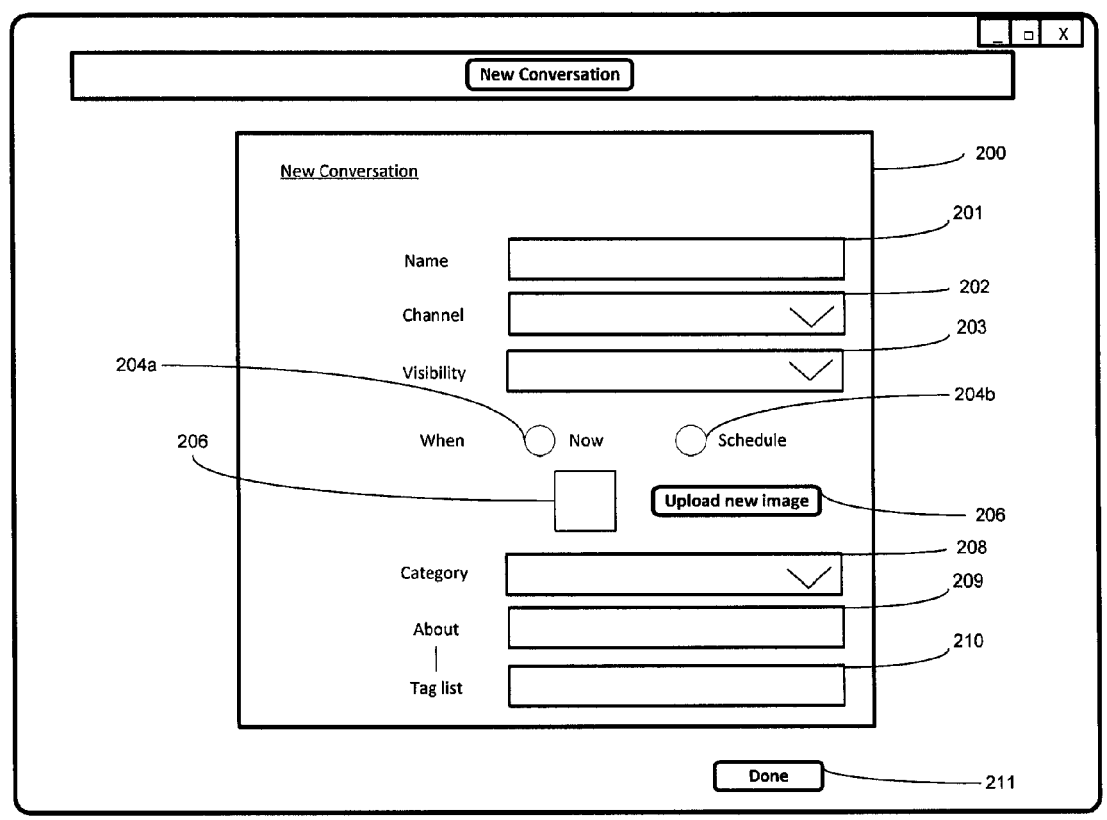
FIG. 3B illustrates the web page of FIG. 3A expanded to enter additional identifying information about the video-based group conversation.
Figure 4A:
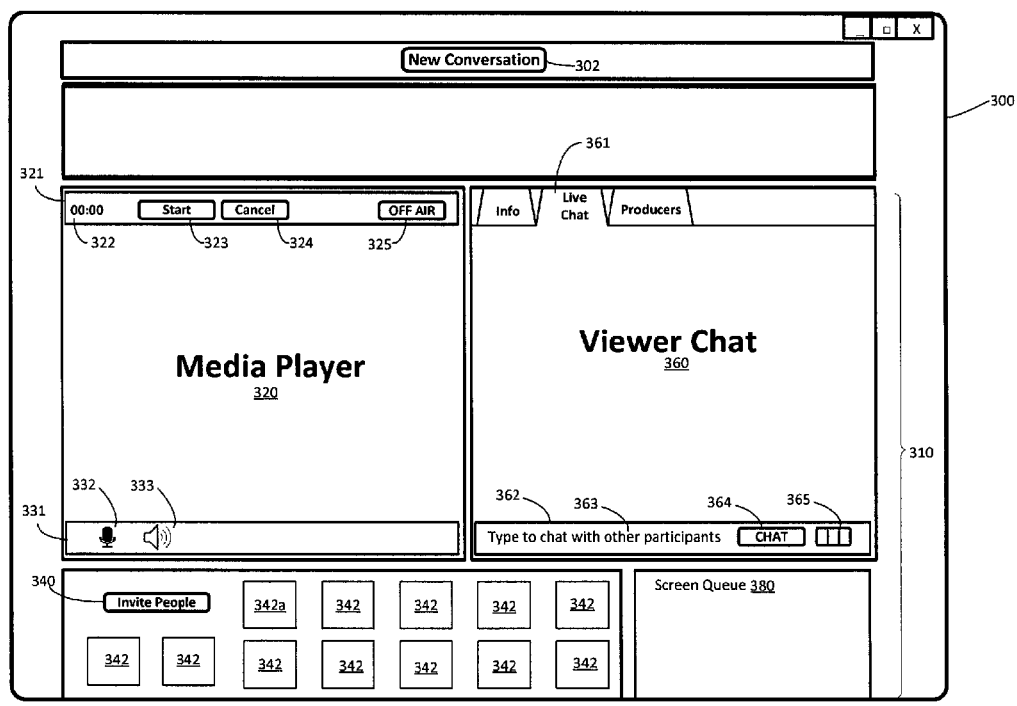
FIG. 4A illustrates a web page having multiple frames for producing a video-based group conversation.

The dialog box 200 also includes an image field 205, where the creator can upload a picture or image using button 206, and a widget 207 for expanding the dialog box 200 to show optional fields. For example, FIG. 3B shows dialog box 200 with widget 207 having been selected to expand the dialog box 200 to show pull-down data field 208, where the creator can select a predefined category for the video-based group conversation, such as interview, comedy, music, etc.; data entry field 209, where the creator can enter a free-form textual description of the video-based group conversation; and data entry field 210, where the creator can enter tags that relate to the video-based group conversation in order to help populate search results. Once all the basic identifying information about the video-based group conversation has been entered in step 122, the video-based group conversation is saved in step 124 when the creator selects button 211, and new production web page 300 is presented to the creator in step 126 as shown in FIG. 4A. Although the video-based group conversation has been created at this point, the creator may not be ready to go live yet, and additional set-up may be required, as further discussed below.

However, since a description of the video-based group conversation has been stored, this description may be made publically accessible and searchable if it is designated as "public," or alternatively, it may be included in a list of video-based group conversations in a specified directory.

3. Producing the Video-Based Group Conversation

A. Pre-Live Staging

As noted above, once the video-based group conversation has been created and basic identifying information saved in step 124 of FIG. 2, a production web page 300 is presented to the creator as shown in FIG. 4A for additional staging and set-up of the event, prior to starting the video-based group conversation. The production web page 300 is generated at the creator's computing device from a web page template stored on the server 20. The web page 300 is configured with a production control area 310 having four distinct sections or frames—media player section 320, video preview area 340, viewer chat section 360, and screen queue 380. Further, each section 320, 340, 360, 380 is configured with its own set of controls, as further described below. In accord with one embodiment, some of the production features can be enabled for the creator, and disabled for all other participants. In another embodiment, some or all of the production features can be shared or assigned by the creator to one or more participants who then become co-producers. In one embodiment, the web page 300 also includes a button 302 configured for initiating a new video-based group conversation.

Media player section 320 is configured to receive and display an integrated streaming video signal and an integrated streaming audio signal from the video-based group conversation service 22. The video-based group conversation service 22 receives multiple video and audio feeds from multiple users as selected by the creator or any co-producer. For example, multiple users may be viewers and/or participants as further described below, and viewers may be selected by the producer as on-screen participants in the group conversation. The selected viewers/participants have the video and audio feed from the camera and microphone of their computing device streamed to the video-based group conversation service 22. The video-based group conversation service then makes these streams available so that the other participants can subscribe to them allowing for viewing them and/or listening to them. In one embodiment, the video-based group conversation service integrates multiple video and audio feeds from multiple selected viewers/participants into a single combined video signal and a single combined audio signal that is streamed to the media player section of web page 300 when the video-based group conversation event is live.

Media player section 320 is also configured with a first control ribbon 321 on the top of the media player section and a second control ribbon 331 on the bottom of the media player section. The first control ribbon includes an elapsed time counter 322, a first control button 323 labeled "START" and a second control button 324 entitled "CANCEL." The elapsed time counter 322 starts when video-based group conversation is started and indicates the elapsed time of the event. Selecting the first button 323 starts the video-based group conversation while selecting the second button 324 cancels the video-based group conversation. The first control ribbon 321 is also configured with a widget 325 having two states: the widget displays the text "OFF AIR," for example, in white letters on a black background, when the video-based group conversation is not being viewed, and the widget displays the text "ON AIR," for example, in white letters on a red background, when the video-based group conversation is being viewed. Additional controls such as buttons or widgets can be configured in the first control ribbon 321 for other control features. For example, if the video-based group conversation is designated as public, then a button to share the video-based group conversation on a social networking site may also be configured (not shown).

The second control ribbon 331 is configured with a first control widget 332 labeled "VOLUME" and a second control widget 333 entitled "MIC." Selecting the MIC widget 333 turns the creator's microphone input from on to off or vice versa and allows the creator to control the gain on his or her microphone, while selecting the VOLUME widget 332 allows the creator to increase or decrease the audio level coming out of the creator's speakers. Additional controls such as buttons or widgets can be configured in the second control ribbon 331 for other control features. For example, the producer's video feed may be displayed in a third widget (not shown), and the producer may choose to include his video feed on-screen or not.

Preview section 340 is configured with a button 341 labeled "INVITE PEOPLE." The creator may invite other participants to join the creator for the video-based group conversation. If the video-based group conversation has been designated as public or unlisted, the creator may simply share the URL with others. If, on the other hand, the video-based group conversation is designated as private, the creator must provide email addresses for all invitees to the system using the INVITE PEOPLE button 341, which causes the service to display a dialog box with entry fields for email addresses.

Figure 4B:
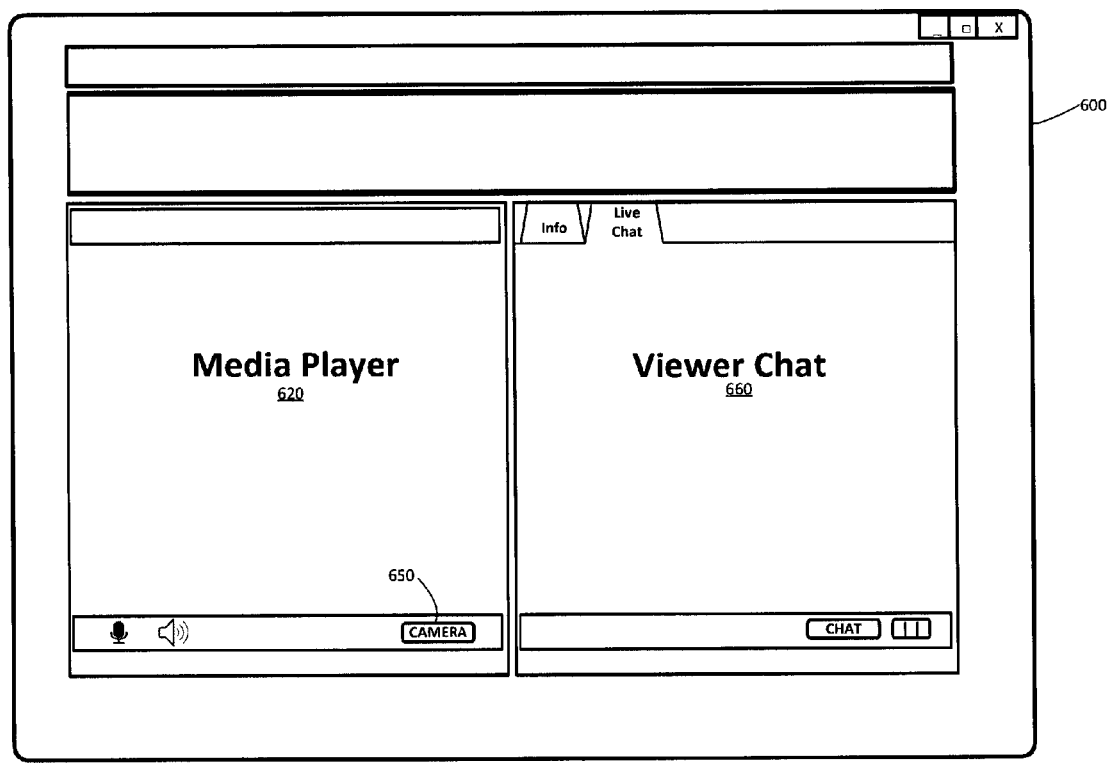
FIG. 4B illustrates a web page having multiple frames for viewing a video-based group conversation.

When other participants join the video-based group conversation by entering the URL or clicking on the link in their email invitation, a production web page 600 is presented to the participants as illustrated in FIG. 4B. The web page 600 that is presented to the participants will also have a media player 620 and a viewer chat area 660 similar to that described above, but will not have all of the control features described herein (i.e., START button, CANCEL button, etc.). Importantly, the participants web page 500 has a "CAMERA" button 630 that allows each participant to request to join the group conversation on camera.

Preview section 340 on the creator's web page 300 also contains a number of discrete thumbnail-sized images that represent each person who is present in the video-based group conversation. The creator and any co-producer may click on any of the thumbnails to access additional controls that are specific to that participant. These controls can include widgets to invite the participant to join on camera, to ban the participant from the video-based group conversation, and to privately text chat with such participant.

Figure 5A:
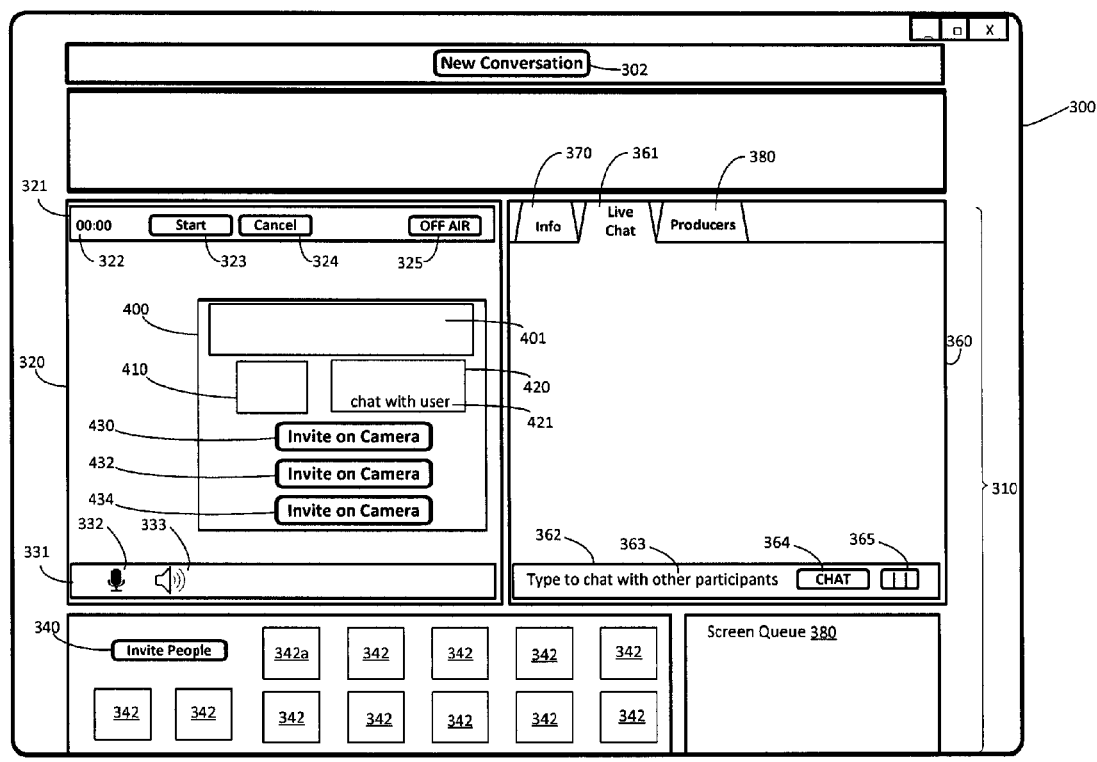
FIG. 5A illustrates the web page of FIG. 4A that presents a pop-up dialog for inviting another user to participate on-screen in the video-based group conversation.

For example, by rolling a computer mouse or other selection device over one of the thumbnail images, and clicking on it, a pop-up display 400 (or "facecard") is presented to the producer on top of web page 300, as illustrated in FIG. 5A. The pop-up display 400 is configured with a top panel 401 that includes identifying information for the selected participant as well as several control buttons including button 430 labeled "INVITE ON CAMERA," a button 432 labeled BAN" and a button 434 labeled "MAKE PRODUCER.".

The BAN button 432 is configured to allow the creator or co-producer to remove a participant from the video-based group conversation. For example, when the BAN button 432 is selected by a producer while viewing a participant's facecard, the participant's web browser or mobile application can be refreshed to return to a home page or home screen. If the participant attempts to go back to the URL or mobile application for the video-based group conversation, the system can deliver a message to the participant saying that the video-based group conversation is not accessible.

The MAKE PRODUCER button 434 is configured button to allow the creator or co-producer to designate that participant as a co-producer. For example, if the MAKE PRODUCER button 434 is selected by the creator or a co-producer, the participant's web browser or mobile application can be refreshed and a new template sent to that participant that shows the producer's view and has a least a limited set, and possibly a full set of associated producer controls.

Figure 5B:
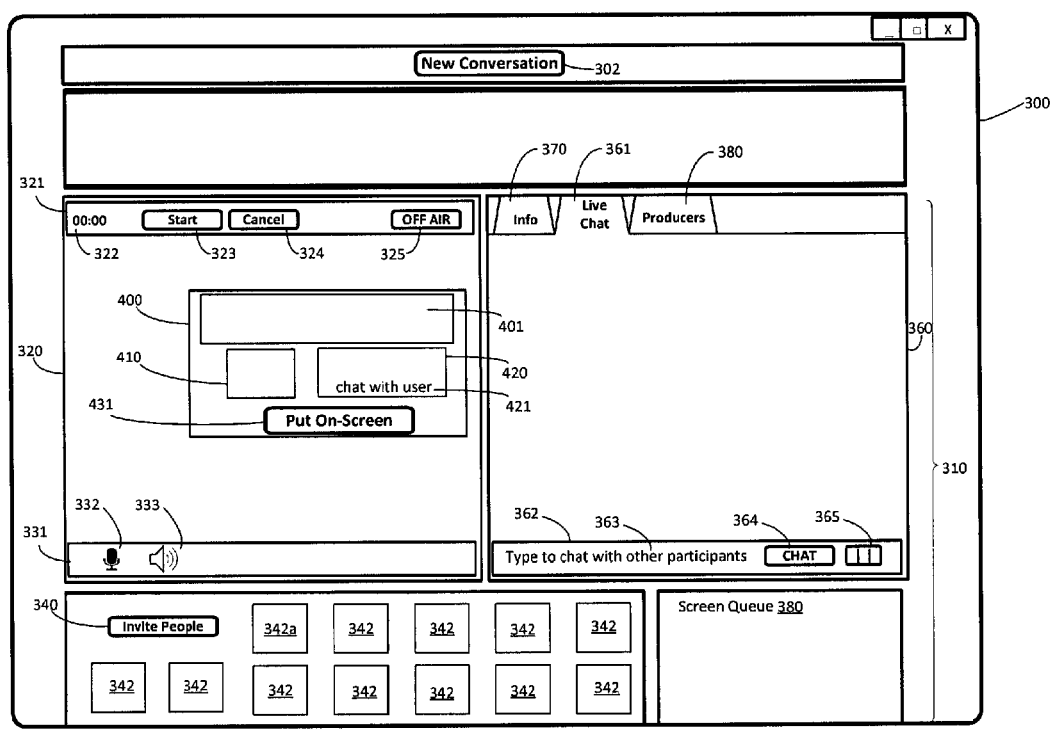
FIG. 5B illustrates the web page of FIG. 5A that presents a pop-up dialog for putting another user on-screen in the video-based group conversation.

When the INVITE ON CAMERA button 430 is selected by the creator or a producer, a corresponding pop-up window is displayed on the selected participant's computing device (not shown) with buttons configured to accept or reject the invitation to be on-screen, as described further below. If the invitation to be on-screen is accepted by the user, the button 430 of pop-up window 400 will be modified and presented as button 431 shown on FIG. 5B to display the label "PUT ON SCREEN." Any producer may continue to chat with the participant in a private text chat area 421. When the creator or producer finally selects button 431, the participant's video and audio feed will be integrated into the live video-based group conversation being viewed on the media player section 620 of web page 600 for all participants. If a participant is invited on camera by a producer or if a participant requests to join on camera (as described earlier) the pop-up display 400 will include a video preview panel 410 that receives and displays the viewer's individual video feed and a private chat window 420 where the selected viewer and producer can chat privately.

The viewer chat section 360 of web page 300 is configured primarily as a text chat or message window for the video-based group conversation, with a tab 361 at the top of the chat section for selecting the chat section. Chats from the participants will be streamed into the chat window 360 and viewable by all participants. A control ribbon 362 is configured at the bottom of the chat section 360 to have a data entry field 363 for entering text. A first button 364 labeled "CHAT" is configured in the control ribbon 362. When the button 364 is selected, the text entered into field 363 is moved into the chat window 360. A second button 365 has the standard symbol for "PAUSE" and when selected, pauses the active state for the chat window for that user.

Figure 5C:
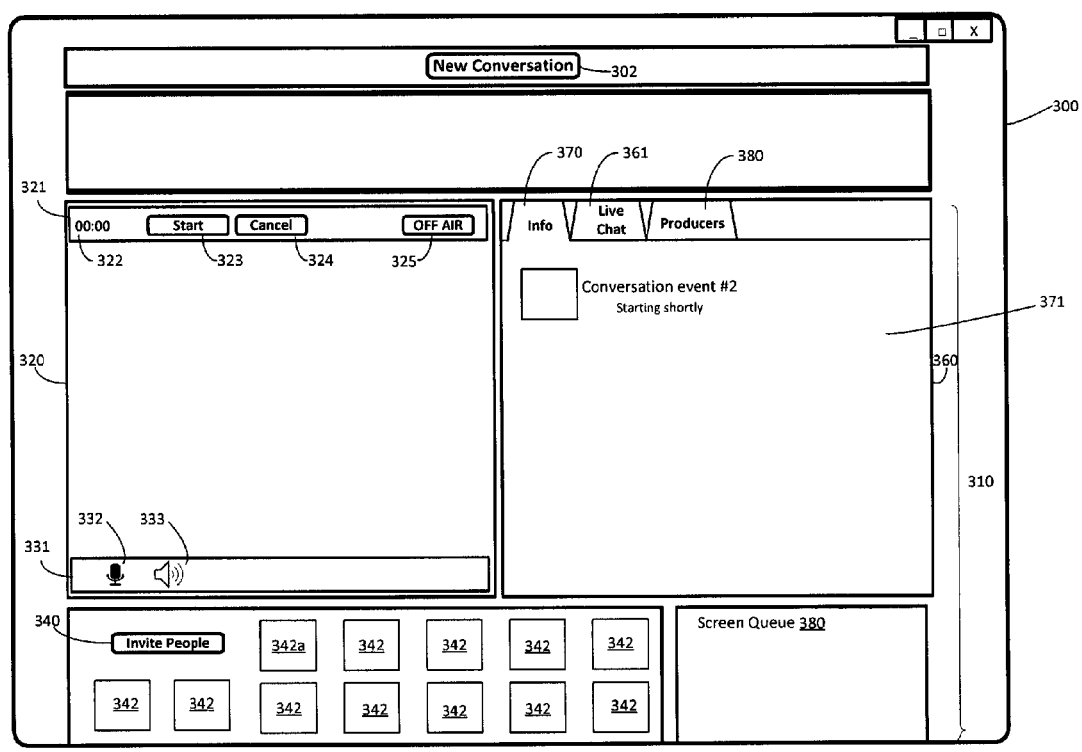
FIG. 5C illustrates the web page of FIG. 4A with another tab for event information in the chat window.
Figure 5D:
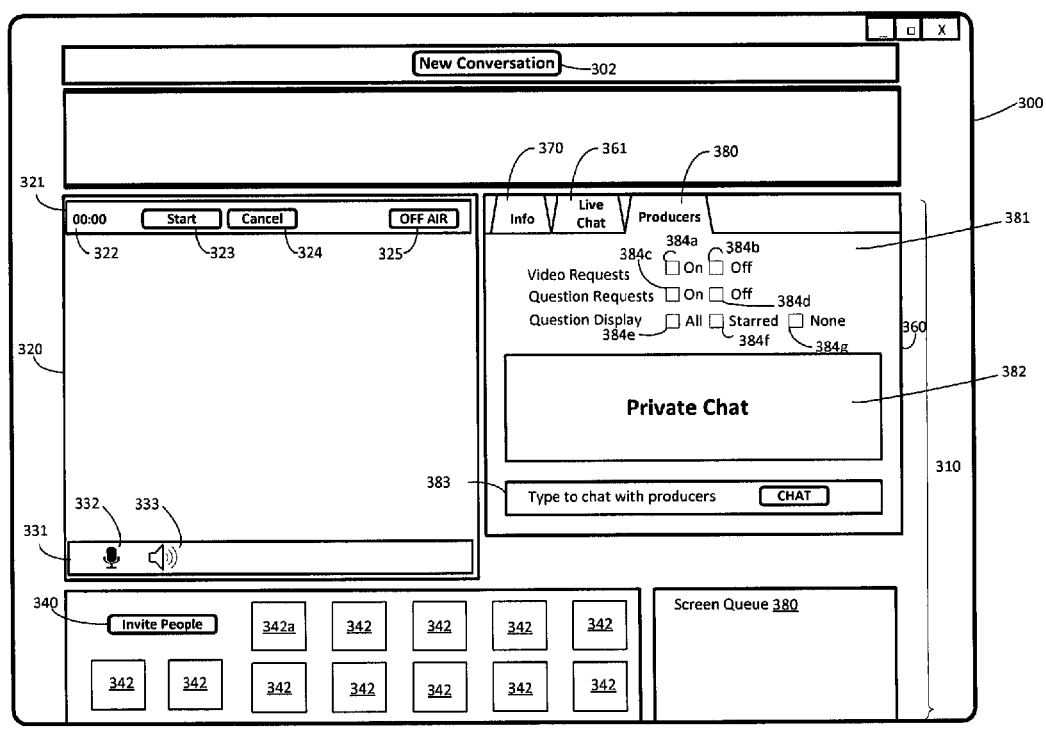
FIG. 5D illustrates the web page of FIG. 4A with another tab for producer interaction in the chat window.

The chat window 360 includes tab 370 labeled "INFO" and tab 380 labeled "PRODUCERS." The PRODUCERS tab 380 is only visible to the creator and co-producers. Selecting the INFO tab 370 reveals another window 371 that is configured to display the information about the video-based group conversation, as shown in FIG. 5C. Selecting the PRODUCERS tab 380 reveals another window 381 that is configured with a chat window 382, a data entry field 383 for entering chat text, and a group of widgets 384 for enabling or disabling various control settings for the producer, as shown in FIG. 5D. For example, selecting widget 384a allows any participant to request to join on camera, while selecting widget 384b disables video requests from other users. Selecting widget 384c allows any participant to ask text based questions and submit external media (i.e. videos, photos, slide decks, etc.), while selecting widget 384d disables question and external media submissions from participants. Widgets 384e, 384f and 384g allow the creator or any producer to control which questions and external media submissions are displayed to the participants.

Figure 4C:
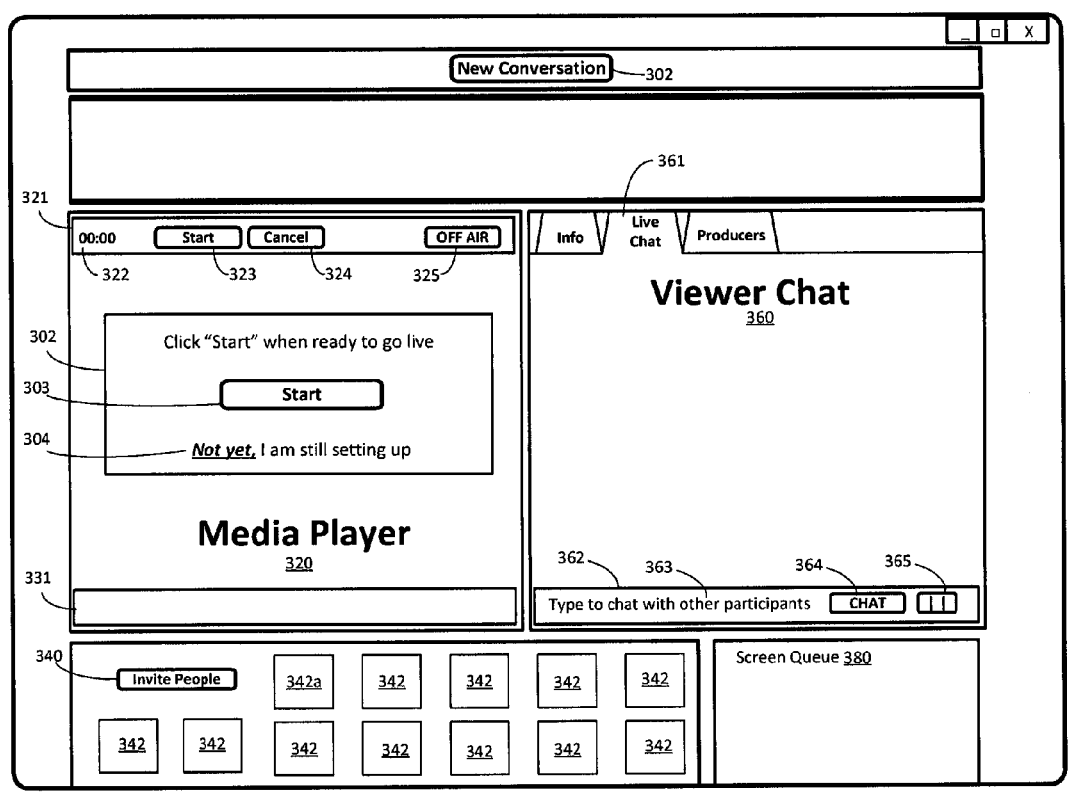
FIG. 4C illustrates the web page of FIG. 4A that presents a pop-up dialog to confirm that the user wants to start the video-based group conversation.

In one embodiment, the initial display of the production web page 300 includes a pop-up dialog 302 presented over the web page with a first button or link 303 that may be selected to start the video-based group conversation, and a second button or link 304 that may be selected to continue with set-up activities prior to starting the video-based group conversation, as shown in FIG. 4C. For example, selecting either button 303 or 304 removes the pop-up 302 so that the production web page 300 appears without the pop-up as in FIG. 4A.

B. Live Video-Based Group Conversation

Figure 6A:
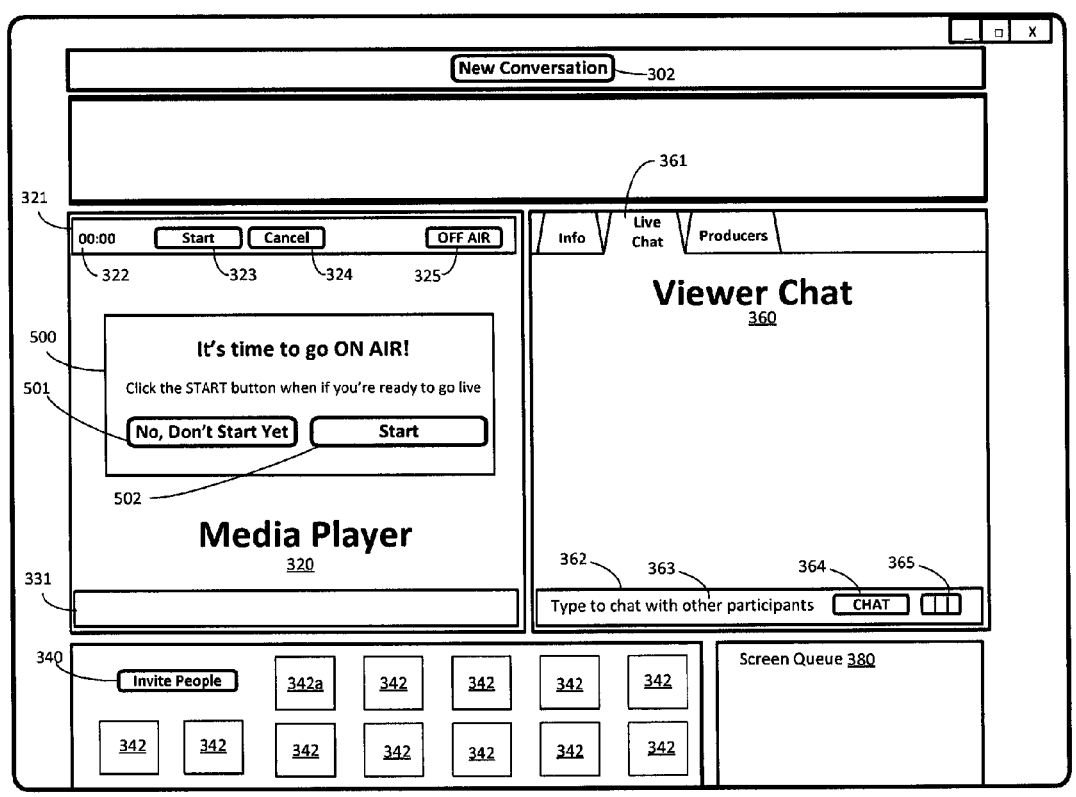
FIG. 6A illustrates the web page of FIG. 4A that presents a pop-up dialog for confirming the request to start the video-based group conversation.

When the producer has completed setting up the video-based group conversation, the START button 323 in the first control ribbon 321 of the media player section 320 is selected. Referring to FIG. 6A, in order to ensure that the creator or co-producer is ready to go live, selecting the START button 323 causes a pop-up dialog 500 to be displayed over the web page 300. The pop-up dialog 500 includes a first button 501 labeled "NO, DON'T START YET" and a second button 502 labeled "START." Thus, if the creator or co-producer is ready to go live, the START button 502 on pop-up dialog 500 is selected; if not, the NO, DON'T START YET button 501 is selected and the system returns to the set-up state.

Figure 6B:
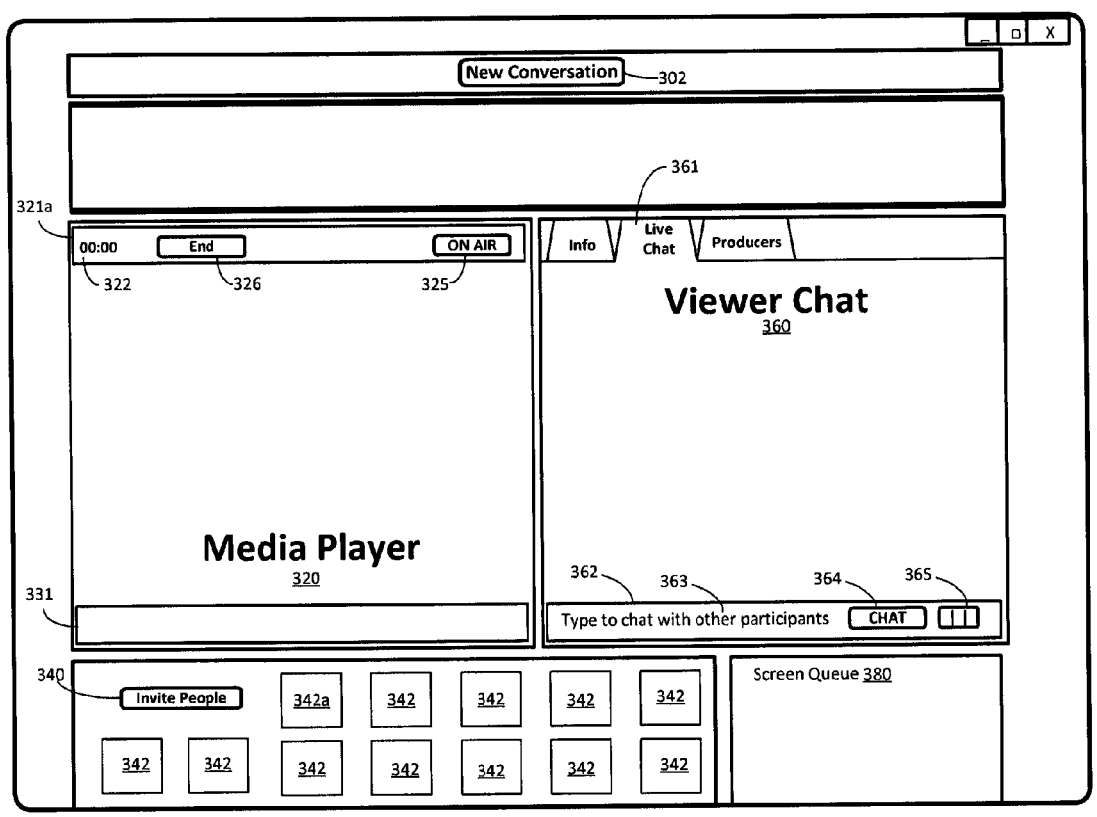
FIG. 6B illustrates the web page of FIG. 6A in a live state.

In the live state, the creator or co-producer can moderate the conversation using all the production controls described above. Further, the control ribbon 321 is replaced by control ribbon 321*a* shown in FIG. 6B, which is configured with button 325 changed to the ON AIR state, and buttons 323 and 324 removed and replaced with a single button 326 labeled "END."

Figure 6C:
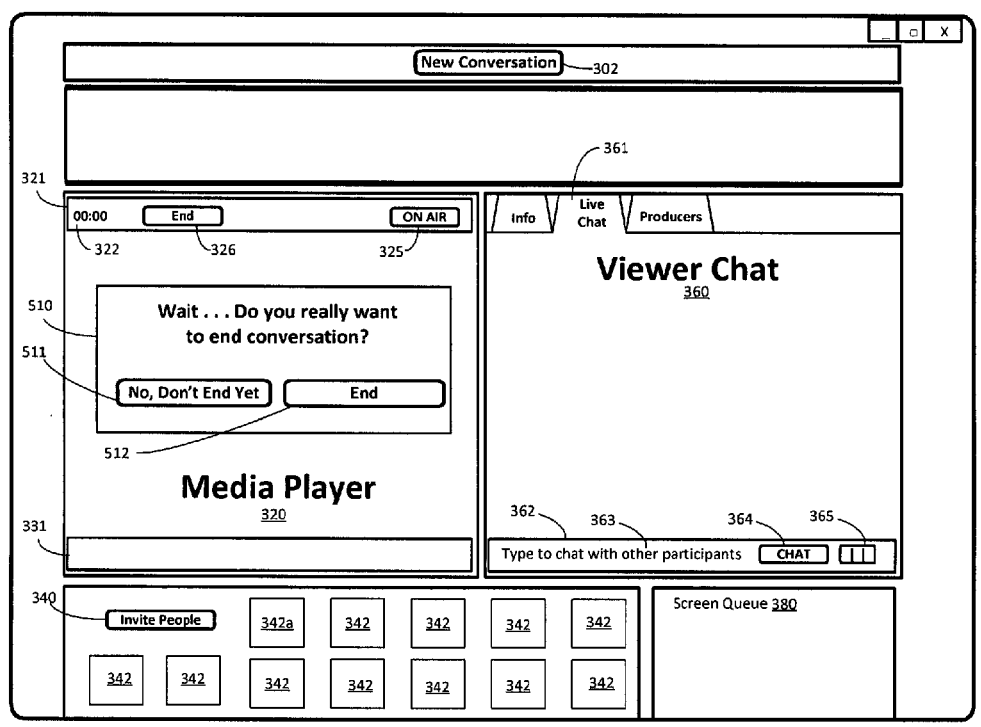
FIG. 6C illustrates the web page of FIG. 6B that presents a pop-up dialog for confirming the request to end the video-based group conversation.

When the creator or co-producer is ready to end the video-based group conversation, the END button 326 on control ribbon 321*a* is selected. This causes a pop-up dialog 510 to be displayed over the web page 300, as shown in FIG. 6C. The pop-up dialog 510 includes a first button 511 labeled "NO, DON'T END YET" and a second button 512 labeled "END." Thus, if the creator or co-producer is ready to end the video-based group conversation, the END button 512 on pop-up dialog 510 is selected, and if not, the NO, DON'T END YET button 511 is selected and the system continues with the live broadcast.

4. Searching for Video-Based Group Conversations

As noted above, if a video-based group conversation is designated as "public," its description may be accessible and searchable through a search input field or through any search engine. For example, a user may conduct a search to locate specific keywords, topics or persons of interest, and one or more video-based group conversations may be listed in the search results, regardless of whether the events are live, recorded or pre-live. The description of the video-based group conversation preferably includes a link to the URL for the video-based group conversation, and by selecting the link and/or navigating to that URL. If the video-based group conversation is live, the user may request or be invited to join as an on-screen participant.

In another embodiment, the web service generates a list or directory of all video-based group conversations, and the list could be made searchable with an indication as to status, i.e., whether the video-based group conversation is public or private. If the video-based group conversation is designated as "public," then a link or URL can be provided to take the user directly to the event. If the video-based group conversation is designated as "private," then a link to the event URL will not be provided, but a different link could be provided to request joining the event, or subscribing to the web service. Unlisted events will not be included in any list or directory.

In yet another embodiment, the web service can provide to authorized users the ability to create personalized or customized lists of video-based group conversations. For example, such a list may include all video-based group conversations to which a user has been invited, and any video-based group conversations that the user has flagged via a search. In another embodiment, the web service can allow the user to create automatic searches, or information feeds, based on keywords or other search criteria.

5. Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for producing a video-based group conversation for transmission over a network, comprising:
    a server having a processor configured to execute instructions;
    a memory coupled to the server and having stored instructions that, when executed by the processor, cause the server to:
        receive a request from a first user at a first user computing device to create a video-based group conversation;
        transmit, in response to the request from the first user, a page template to the first user computing device via the network, the page template configured to generate a production page on a display of the first user computing device, the production page having a plurality of sections including at least a preview section configured for previewing a plurality of video feeds, and a media player section configured for displaying at least one video signal including at least some of the plurality of video feeds, and a set of production controls configured to select video feeds to display as the video signal in the media player section;
        open a first communications channel with the first user computing device and the server via the network to enable streaming data between the server computer and the production page displayed on the first user computing device;
        identify a plurality of potential viewers for the video-based group conversation;
        receive requests from at least some of the plurality of potential viewers to join the video-based group conversation as a participant;
        receive a video feed from at least some of the potential viewers;
        transmit the received video feeds to the preview section of the production page;
        receive a selection via the production controls of at least some of the video feeds;
        enable display of the selected video feeds as the video signal in the media player section of the production page; and
        streaming the video signal over the network.

2. The system of claim 1, comprising further instructions that, when executed by the processor, cause the server to:
    generate a first plurality of controls enabled for the first user, including a first control configured to start the video-based group conversation and a second control configured to end the video-based group conversation; and
    generate a second plurality of controls enabled for the first user, including a third control configured to select a plurality of viewers to participate in the group conversation or to remove the viewers from the group conversation.

3. The system of claim 1, comprising further instructions that, when executed by the processor, cause the server to:
    transmit the page template as further configured to display a chat section on the production page for receiving and publically displaying chats from a plurality of participants to all viewers.

4. The system of claim 3, comprising further instructions that, when executed by the processor, cause the server to:
    transmit the page template as further configured to display a producer control on the production page for the public chat section whereby the producer is enabled to select whether or not to publically display chats received from participants in the media player section.

5. The system of claim 3, comprising further instructions that, when executed by the processor, cause the server to:
transmit the page template as further configured to display an information page, wherein the information page displays information about the video-based group conversation.

6. The system of claim 3, comprising further instructions that, when executed by the processor, cause the server to:
transmit the page template as further configured to display a producers page, wherein the producers page includes a private chat window for conducting off-screen chats with participants.

7. The system of claim 1, comprising further instructions that, when executed by the processor, cause the server to:
transmit the page template as further configured to display a screen queue section on the production page for receiving questions from participants and displaying the questions to a producer.

8. The system of claim 7, comprising further instructions that, when executed by the processor, cause the server to:
transmit the page template as further configured to display a producer control for the screen queue section on the production page whereby the producer is enabled to select whether or not to publically display the questions and/or external media links in the media player section.

9. The system of claim 1, comprising further instructions that, when executed by the processor, cause the server to:
transmit the page template as further configured to display a screen queue section on the production page for receiving links to external media from participants and displaying the underlying external media to a producer.

10. The system of claim 1, further comprising
the set of production controls are configured to enable the first user to preview the plurality of video feeds in the preview section.

11. The system of claim 10, further comprising instructions that, when executed by the processor, cause the server to:
generate a first production control that is configured to enable the first user to designate at least one other user as enabled to use at least some of the set of production controls.

12. The system of claim 10, further comprising instructions that, when executed by the processor, cause the server to:
generate a second production control that is configured to enable the first user to interact in real time with users associated respectively with the plurality of video feeds in the preview section.

13. The system of claim 10, further comprising instructions that, when executed by the processor, cause the server to:
generate a third production control that is configured to enable the first user to interact in real time with users associated respectively with the plurality of video feeds in the media player section.

14. A method for producing a video-based group conversation for transmission over a network, comprising:
receiving, at a server, a request from a first user at a first user computing device to create a video-based group conversation;
in response to the request from the first user, transmitting a page template from the server to the first user computing device via the network, the page template configured to generate a production page on a display of the first user computing device, the production page having a plurality of sections including at least a preview section configured for previewing a plurality of video feeds, and a media player section configured for displaying at least one video signal including at least some of the plurality of video feeds, and a set of production controls configured to select video feeds to display as the video signal in the media player section;
opening a first communications channel with the first user computing device and the server via the network to enable streaming data between the server and the production page displayed on the first user computing device;
identifying, at the server, a plurality of potential viewers for the video-based group conversation;
receiving, at the server, requests from at least some of the plurality of potential viewers to join the video-based group conversation on camera;
receiving a video feed from at least some of the potential viewers;
transmitting the received video feeds to the preview section of the production page;
receiving a selection via the production controls of at least some of the video feeds;
enabling, by the server, display of the selected video feeds as the video signal in the media player section of the production page; and
streaming the video signal over the network.

15. The method of claim 14, further comprising:
generating a first plurality of controls enabled for the first user, including a first control configured to start the video-based group conversation and a second control configured to end the video-based group conversation; and
generating a second plurality of controls enabled for the first user, including a third control configured to select a plurality of viewers to participate in the group conversation or to remove the viewers from the group conversation.

16. The method of claim 14, further comprising:
transmitting the page template as further configured to display a chat section on the production page for receiving and publically displaying chats from a plurality of participants to all viewers.

17. The method of claim 16, further comprising:
transmitting the page template as further configured to display a producer control on the production page for the public chat section whereby the producer is enabled to select whether or not to publically display chats received from participants in the media player section.

18. The method of claim 16, further comprising:
transmitting the page template as further configured to display an information page, wherein the information page displays information about the video-based group conversation.

19. The method of claim 16, further comprising:
transmitting the page template as further configured to display a producers page, wherein the producers page includes a private chat window for conducting off-screen chats with participants.

20. The method of claim 14, further comprising:
transmitting the page template as further configured to display a screen queue section on the production page for receiving questions from participants and displaying the questions to a producer.

21. The method of claim 20, further comprising:
transmitting the page template as further configured to display a producer control on the production page for the screen queue section whereby the producer is enabled to select whether or not to publically display the questions and/or external media links in the media player section.

22. The method of claim 14, further comprising:
transmitting the page template as further configured to display a screen queue section on the production page for receiving external media from participants and to displaying the external media to a producer.

23. A computer program product, comprising a non-transitory computer-readable medium having a computer-readable program code embodied therein, the computer-readable program code adapted to be executed by one or more processors to implement a method for transmission of multiple video and audio streams over a network, the method comprising:
generating, by a server, a page template for generating a production page at a user computer, the page template configured to display a plurality of sections on the production page including at least a preview section configured for previewing a plurality of video feeds, and a media player section configured for displaying a video signal including at least some of the plurality of video feeds, and a set of production controls configured to select video feeds to display as the video signal in the media player section;
receiving, at the server, a request from a first user at a first user computing device to create a video-based group conversation;
in response to the request from the first user, transmitting the page template from the server to the first user computing device via the network, and opening a first communications channel with the first user computing device and the server via the network to enable streaming data between the server and the production page displayed on the first user computing device;
identifying, at the server, a plurality of potential viewers for the video-based group conversation;
receiving, at the server, requests from at least some of the plurality of potential viewers to join the video-based group conversation on camera;
receiving a video feed from at least some of the potential viewers;
transmitting the received video feeds to the preview section of the production page;
receiving a selection via the production controls of at least some of the video feeds;
enabling, by the server, display of the selected video feeds as the video signal in the media player section of the production page; and
streaming the video signal over the network.

24. The computer program product of claim 23, wherein the method further comprises:
generating a first plurality of controls enabled for the first user in the media player section, including a first control configured to start the video-based group conversation and a second control configured to end the video-based group conversation; and
generating a second plurality of controls enabled for the first user in the preview section, including a third control configured to select a plurality of viewers to participate in the group conversation or to remove the viewers from the group conversation.

* * * * *